(12) United States Patent
Mayhan

(10) Patent No.: US 9,071,483 B1
(45) Date of Patent: Jun. 30, 2015

(54) PRESENTING VOP CALL TRACE DATA

(75) Inventor: Heather M. Mayhan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2210 days.

(21) Appl. No.: 11/548,686

(22) Filed: Oct. 11, 2006

(51) Int. Cl.
*H04L 12/66* (2006.01)
*H04L 29/06* (2006.01)
*H04M 7/00* (2006.01)
*G06F 15/173* (2006.01)

(52) U.S. Cl.
CPC ......... *H04L 29/06027* (2013.01); *H04M 7/006* (2013.01)

(58) Field of Classification Search
CPC ............ H04M 3/5166; H04M 3/5191; H04M 3/5233; H04M 3/42068; H04M 3/42093; H04M 3/5175; H04M 3/42221; H04M 3/51; H04M 7/006; H04M 51/06; H04M 15/00; H04M 15/58; H04M 15/70; H04M 15/73; H04M 2215/0188; H04M 2215/70; H04M 2215/7072; H04L 43/50

USPC ......... 370/352; 709/224; 379/114.14, 265.02, 379/88.18, 265.06, 265.07; 707/1, 100
See application file for complete search history.

(56) References Cited

U.S. PATENT DOCUMENTS

| | | | |
|---|---|---|---|
| 2003/0142803 A1* | 7/2003 | Freedman et al. | 379/114.14 |
| 2006/0117187 A1* | 6/2006 | Hollatz et al. | 713/182 |
| 2007/0036127 A1* | 2/2007 | Roosen et al. | 370/352 |
| 2007/0294389 A1* | 12/2007 | Bauer et al. | 709/224 |

* cited by examiner

*Primary Examiner* — Melanie Jagannathan
*Assistant Examiner* — Stephanie Chang

(57) ABSTRACT

An embodiment of a method, system, and medium provide for determining information about a communications call. The method includes receiving call data associated with establishing a communications path to communicate at least a portion of data using a voice-over-packet technology, and formatting at least a portion of said call data such that a source identifier and a destination identifier are viewable in a common area along with two or more of the following call-identifier information; physical-termination information and possible release codes. The format can be filterable.

15 Claims, 13 Drawing Sheets

CALL MESSAGES
IAM

IP SRC: 172.16.129.72/2905
IP DST: 172.16.129.74/50288

MTP 3 USER ADAPTATION LAYER:
 VERSION: 1
 RESERVED: 0
 MESSAGE CLASS: (1) TRANSFER MESSAGES
 MESSAGE TYPE: (1) DATA
 LENGTH: 92
 NETWORK APPEARANCE:
  PARAMETER TAG: (0X200) NETWORK APPEARANCE
  PARAMETER LENGTH: 8
   NETWORK APPEARANCE: 16777216
 PROTOCOL DATA:
  PARAMETER TAG: (0X210) PROTOCOL DATA
  PARAMETER LENGTH: 65
   OPC: 214-45-1
   DPC: 214-195-1
   SI: 5
   NI: 2
   MP: 0
   SLS: 25
 ROUTING CONTEXT:
 . . .

*AND ON AND ON FOR
ABOUT 140 PAGES
(DATA IS FOR A SINGLE
COMMUNICATIONS)*

*FIG. 3.*

```
400 →   ################################################
        ++BYE
  412   IP SRC: 172.16.131.63/7050       "AST-I-CSCF(O)"
        IP DST: 172.16.129.74/51036      "KSCYMO-LNC"

SIP
        Command [BYE] -- Release the call
          Sip-url         = sip:9132699702@172.16.129.74:51036
          Sip-version     = SIP/2.0
        Parameters:
          Via             [via] :
            Transport:    SIP/2.0/UDP
            Sent-By:      172.16.131.63
            Port-Number   :7050
            Via-Parameters branch=z9hG4bKPK_START:ipK2A9132699702@40ims.spcsdns.netX
        2373783632283PK_END
          Via             [via] :
            Transport:    SIP/2.0/UDP
            Sent-By:      172.18.89.70
            Port-Number   :5061
            Via-Parameters branch=z9hG4bK0g4k7a3090i1tak4j0cis.d000010.1
          Call-ID         [Call-ID] : 001ED938-5002F770172.16.129.74
          Command-Sequence [CSeq] :
            Sequence Number: 2
            Method:       BYE
          From            [from] :
            Address:      <sip:9072955107@ims.spcsdns.net
            Extension params: user=phone>
            Tag Label:    Sd690798-0c9024c51f0b1b1844a6a36300
          To              [to] :
            Address:      <sip:9132699702@ims.spcsdns.net:51036
            Extension params: user=phone>
            Tag Label:    1000000-0-1437669244
          Content-Length  [Content-Length] :
            Length:       0
          User-Agent      [User-Agent] :
            Product:      Avaya
            Product:      CM/R013x.00.1.346.0
          Max-Forwards    [Max-Forwards] :
            No. of times remaining to be forwarded:67

Server: sfd-ngnas-sce-1
        Timestamps: Min: Jul 5, 2006 11:11:20.563721246 CDT, Max: Jul 5, 2006 11:11:20.5
        81400000 CDT
```

FIG. 4.

| | A | B | C | D | E | F | G | H | I |
|---|---|---|---|---|---|---|---|---|---|
| 1 | SIGTRAN | | | | | | | | |
| 2 | IAM | From | KSCYMO-LSG | To KSCYMO-LNC | OPC 214.145.1 | DST 214.195.1 | | | Timestamp Jul 5, 2006 11:10:31.635492000 CDT |
| 3 | | | | | | | | | |
| 4 | Megaco Add Request - 1 | From | KSCYMO-LNC | To KSCYMO-LNG | TermID 1/4/3/1 | ECAN ON | | | Timestamp Jul 5, 2006 11:10:31.670662000 CDT |
| 5 | | | | | | | | | |
| 6 | | | | | | | | | |
| 7 | Megaco Add Request - 2 | From | KSCYMO-LNC | To KSCYMO-LNG | TermID 1/4/9/1 | ECAN ON | | | Timestamp Jul 5, 2006 11:10:31.670662000 CDT |
| 8 | | | | | | | | | |
| 9 | | | | | | | | | |
| 10 | MEGACO Add Reply - 1 | From | KSCYMO-LNG | To KSCYMO-LNC | CTXT ID 1802679 | TermID 1/4/3/1 | SDP IP 172.16.129.197 | SDP Port 25302 | Timestamp Jul 5, 2006 11:10:31.795492000 CDT |
| 11 | | | | | | | | | |
| 12 | | | | | | | | | |
| 13 | MEGACO Add Reply - 2 | From | KSCYMO-LNG | To KSCYMO-LNC | CTXT ID 1802679 | TermID 1/4/9/1 | SDP IP 172.16.129.197 | SDP Port 25302 | Timestamp Jul 5, 2006 11:10:31.795492000 CDT |
| 14 | | | | | | | | | |
| 15 | | | | | | | | | |
| 16 | SIP INVITE | From | KSCYMO-LNC | To LNXF5 Blg IP(o) | Call ID 001E0938-56B2F | | SDP IP 172.16.129.197 | SDP Port 25302 | Timestamp Jul 5, 2006 11:10:31.796829630 CDT |
| 17 | | | | | | | | | |
| 18 | | | | | | | | | |
| 19 | SIP INVITE | From | KSCYMO-LNC | To RST-I-CSCF(o) | Call ID 001E0938-56B2F | | SDP IP 172.16.129.197 | SDP Port 25302 | Timestamp |
| 20 | | | | | | | | | |
| 21 | | | | | | | | | |
| 22 | SIP 100 Trying | From | RST-I-CSCF(o) | To KSCYMO-LNC | Call ID 001E0938-56B2F | | | | Timestamp |
| 23 | | | | | | | | | |
| 24 | | | | | | | | | |
| 25 | SIP INVITE | From | RST-I-CSCF(o) | To LNX-SBC-T | Call ID 001E0938-56B2F | | SDP IP 172.16.129.197 | SDP Port 25302 | Timestamp Jul 5, 2006 11:10:31.917727274 CDT |
| 26 | | | | | | | | | |
| 27 | | | | | | | | | |
| 28 | SIP 100 Trying | From | LNX-SBC-T | To RST-I-CSCF(o) | Call ID 001E0938-56B2F | | | | Timestamp |
| 29 | | | | | | | | | |
| 30 | | | | | | | | | |
| 31 | SIP INVITE | From | | To | Call ID SDd8302b1-b2b2 | | SDP IP 10.38.245.193 | SDP Port 50264 | Timestamp Jul 5, 2006 11:10:31.952655973 CDT |
| 32 | | | | | | | | | |
| 33 | | | | | | | | | |
| 34 | SIP 100 Trying | From | | To | Call ID SDd8302b1-b2b2 | | | | Timestamp Jul 5, 2006 11:10:31.962092853 CDT |
| 35 | | | | | | | | | |
| 36 | | | | | | | | | |
| 37 | SIP INVITE | From | | To | Call ID Cc3024c51f2b15 | | SDP IP 10.38.245.136 | SDP Port 2700 | Timestamp Jul 5, 2006 11:10:32.083126490 CDT |
| 38 | | | | | | | | | |

| | A | B | C | D | E | F | G | H |
|---|---|---|---|---|---|---|---|---|
| 38 | INVITE | | | 0x9024c5f10a15 | | 10.21.245.138 | 2780 | Jul 5, 2006 11:10:32.002126400 CDT |
| 39 | | | | | | | | |
| 40 | SIP | From | To | Call ID | | | | Timestamp |
| 41 | 100 Trying | | | 0x9024c5f10a15 | | | | Jul 5, 2006 11:10:32.098657280 CDT |
| 42 | | | | | | | | |
| 43 | SIP | From | To | Call ID | | SDP IP | SDP Port | Timestamp |
| 44 | INVITE | LNX-SBC-T | LNX-F5 Big IP | SDx9a65d1-586c | | 172.16.89.70 | 52348 | Jul 5, 2006 11:10:32.102777479 CDT |
| 45 | | | | | | | | |
| 46 | SIP | From | To | Call ID | | SDP IP | SDP Port | Timestamp |
| 47 | INVITE | LNX-SBC-T | LNX-I-CSCF(e) | SDx9a65d1-586c | | 172.16.89.70 | 52348 | Jul 5, 2006 11:10:32.103155200 CDT |
| 48 | | | | | | | | |
| 49 | SIP | From | To | Call ID | | | | Timestamp |
| 50 | 100 Trying | LNX-I-CSCF(e) | LNX-SBC-T | SDx9a65d1-586c | | | | Jul 5, 2006 11:10:32.116182769 CDT |
| 51 | | | | | | | | |
| 52 | SIP | From | To | Call ID | | SDP IP | SDP Port | Timestamp |
| 53 | INVITE | LNX-I-CSCF(e) | KSCYMO-LNC | SDx9a65d1-586c | | 172.16.89.70 | 52348 | Jul 5, 2006 11:10:32.127501314 CDT |
| 54 | | | | | | | | |
| 55 | SIP | From | To | Call ID | | | | Timestamp |
| 56 | 100 Trying | KSCYMO-LNC | LNX-I-CSCF(e) | SDx9a65d1-586c | | | | Jul 5, 2006 11:10:32.135321300 CDT |
| 57 | | | | | | | | |
| 58 | SIGTRAN | From | To | OPC | DST | CIC | | Timestamp |
| 59 | IAM | KSCYMO-LNC | KSCYMO-LSG | 214-195-1 | 214-20-3 | | | Jul 5, 2006 11:10:32.616430000 CDT |
| 60 | | | | | | | | |
| 61 | SIGTRAN | From | To | OPC | OPC | CIC | | Timestamp |
| 62 | ACM | KSCYMO-LSG | KSCYMO-LNC | 214-20-3 | 214-195-1 | | 148 | Jul 5, 2006 11:10:33.305480300 CDT |
| 63 | | | | | | | | |
| 64 | Megaco | From | To | TermID | ECAN | | | Timestamp |
| 65 | Add Request - 1 | KSCYMO-LNC | FTWOTX-LNG | T4/62/24 | ON | | | Jul 5, 2006 11:10:33.377132000 CDT |
| 66 | | | | | | | | |
| 67 | Megaco | From | To | TermID | ECAN | | | Timestamp |
| 68 | Add Request - 2 | KSCYMO-LNC | FTWOTX-LNG | T4/62/24 | ON | | | Jul 5, 2006 11:10:33.377132000 CDT |
| 69 | | | | | | | | |
| 70 | MEGACO | From | To | CTXT ID | TermID | SDP IP | SDP Port | Timestamp |
| 71 | Add Reply - 1 | FTWOTX-LNG | KSCYMO-LNC | 4000495 | T4/62/24 | 172.16.89.70 | 52348 | Jul 5, 2006 11:10:33.436850300 CDT |
| 72 | | | | | | | | |
| 73 | MEGACO | From | To | CTXT ID | TermID | SDP IP | SDP Port | Timestamp |
| 74 | Add Reply - 2 | FTWOTX-LNG | KSCYMO-LNC | 4000495 | T4/62/24 | 172.16.89.70 | 52348 | Jul 5, 2006 11:10:33.436850300 CDT |

*FIG. 5B.*

| | A | B | C | D | E | F | G | H | I |
|---|---|---|---|---|---|---|---|---|---|
| 74 | Add Reply - 2 | F1WDX-LNS | KSCYMO-LNC | 4003486 | T4/62/24 | 172.16.89.70 | | 52348 | Jul 5, 2006 11:10:33.496853000 CDT |
| 75 | | | | | | | | | |
| 76 | RTP 172.16.89.70/52348 <> 172.16.137.165/28230 | | | | | | | | |
| 77 | | | | | | | | | |
| 78 | SIP | From | To | Call ID | | SDP IP | SDP Port | Timestamp | |
| 79 | 183 Session Progress | KSCYMO-LNC | LNX-I-CSCF(o) | SD0j4x6501-536sc | | 172.16.137.165 | 28230 | Jul 5, 2006 11:10:33.515644000 CDT | |
| 80 | | | | | | | | | |
| 81 | SIP | From | To | Call ID | | SDP IP | SDP Port | Timestamp | |
| 82 | 183 Session Progress | LNX-I-CSCF(o) | LNX-SBC-T | SD0j4x6501-536sc | | 172.16.137.165 | 28230 | Jul 5, 2006 11:10:33.518786917 CDT | |
| 83 | | | | | | | | | |
| 84 | SIP | From | To | Call ID | | SDP IP | SDP Port | Timestamp | |
| 85 | 183 Session Progress | | | 0c8924c516a15 | | 10.30.245.190 | 50086 | Jul 5, 2006 11:10:33.532297746 CDT | |
| 86 | | | | | | | | | |
| 87 | SIP | From | To | Call ID | | SDP IP | SDP Port | Timestamp | |
| 88 | 183 Session Progress | | | SD0j6t0201-x2x2 | | 10.30.245.136 | 2698 | Jul 5, 2006 11:10:33.534428868 CDT | |
| 89 | | | | | | | | | |
| 90 | SIP | From | To | Call ID | | SDP IP | SDP Port | Timestamp | |
| 91 | 183 Session Progress | LNX-SBC-T | RST-I-CSCF(o) | 001ED938-58623F | | 172.16.89.70 | 52346 | | |
| 92 | | | | | | | | | |
| 93 | SIP | From | To | Call ID | | SDP IP | SDP Port | Timestamp | |
| 94 | 183 Session Progress | RST-I-CSCF(o) | KSCYMO-LNC | 001ED938-58623F | | 172.16.89.70 | 52346 | | |
| 95 | | | | | | | | | |
| 96 | MEGACO | From | To | CTXT ID | TermID | SDP IP | SDP Port | Timestamp | |
| 97 | Modify Request - 1 | KSCYMO-LNC | KSCYMO-LNS | 1502679 | T/4/91 | 172.16.89.70 | 52346 | Jul 5, 2006 11:10:33.849832000 CDT | |
| 98 | | | | | | | | | |
| 99 | MEGACO | From | To | CTXT ID | TermID | SDP IP | SDP Port | Timestamp | |
| 100 | Modify Request - 2 | KSCYMO-LNC | KSCYMO-LNS | 1502679 | T/4/91 | 172.16.89.70 | 52346 | | |
| 101 | | | | | | | | | |
| 102 | RTP 172.16.129.197/5340 <> 172.16.89.70/52346 | | | | | | | | |
| 103 | | | | | | | | | |
| 104 | SIGTRAN | From | To | OPC | DPC | CIC | | | Timestamp |
| 105 | ACM | KSCYMO-LNC | KSCYMO-LSG | 214-195.1 | 214-45.1 | 101 | | | Jul 5, 2006 11:10:33.758893000 CDT |
| 106 | | | | | | | | | |
| 107 | SIGTRAN | From | To | OPC | DPC | CIC | | Event | Timestamp |
| 108 | CPG | KSCYMO-LSG | KSCYMO-LNC | 214-20.3 | 214-195.1 | | | 148 PROGRESS | Jul 5, 2006 11:10:34.696465000 CDT |
| 109 | | | | | | | | | |
| 110 | SIGTRAN | From | To | OPC | DPC | CIC | | | Timestamp |
| 111 | ANM | KSCYMO-LSG | KSCYMO-LNC | 214-20.3 | 214-195.1 | | | 148 | Jul 5, 2006 11:10:44.955520000 CDT |

*FIG. 5C.*

| | A | B | C | D | E | F | G | H | I |
|---|---|---|---|---|---|---|---|---|---|
| 111 | AMM | | KSCYMO-LSG | KSCYMO-LNC | 214.20-3 | 214.195-1 | | | Jul 5, 2006 11:10:44.955603000 CDT |
| 112 | | | | | | | | | |
| 113 | RTP 10.30.245.136/2700 <> 10.30.245.136/50368 | | | | | | | | |
| 114 | | | | | | | | | |
| 115 | RTP 10.30.245.198/50364 <> 10.30.245.136/2698 | | | | | | | | |
| 116 | | | | | | | | | |
| 117 | RTP 172.16.1.29.197/25342 <> 172.16.69.70/52346 | | | | | | | | |
| 118 | | | | | | | | | |
| 119 | SIGTRAN | From | To | OPC | DPC | CIC | | Timestamp | |
| 120 | AMM | KSCYMO-LNC | KSCYMO-LSG | 214.195-1 | 214.45-1 | 101 | | Jul 5, 2006 11:10:45.142974000 CDT | |
| 121 | | | | | | | | | |
| 122 | SIP | From | To | Call ID | | SDP IP | SDP Port | Timestamp | |
| 123 | re-INVITE | | | 0c30024c516fa15 | | | | Jul 5, 2006 11:10:45.316343057 CDT | |
| 124 | | | | | | | | | |
| 125 | SIP | From | To | Call ID | | SDP IP | SDP Port | Timestamp | |
| 126 | re-INVITE | | | SD0e60a201-4(2e2 | | | | Jul 5, 2006 11:10:45.219837130 CDT | |
| 127 | | | | | | | | | |
| 128 | SIP | From | To | Call ID | | SDP IP | SDP Port | Timestamp | |
| 129 | re-INVITE | LNX-SBC-T | LNX-I-CSCF(e) | SD0e9ce501-536c | | | | Jul 5, 2006 11:10:45.225036412 CDT | |
| 130 | | | | | | | | | |
| 131 | SIP | From | To | Call ID | | SDP IP | | Timestamp | |
| 132 | re-INVITE | LNX-SBC-T | RST-I-CSCF(o) | 001E8939-5465cF | | | | | |
| 133 | | | | | | | | | |
| 134 | SIP | From | To | Call ID | | SDP IP | SDP Port | Timestamp | |
| 135 | 100 Trying (re) | LNX-I-CSCF(e) | LNX-SBC-T | SD0e9ce501-536c | | | | Jul 5, 2006 11:10:45.239111036 CDT | |
| 136 | | | | | | | | | |
| 137 | SIP | From | To | Call ID | | SDP IP | SDP Port | Timestamp | |
| 138 | re-INVITE | LNX-I-CSCF(e) | KSCYMO-LNC | SD0e9ce501-536c | | | | Jul 5, 2006 11:10:45.243065000 CDT | |
| 139 | | | | | | | | | |
| 140 | SIP | From | To | Call ID | | | | Timestamp | |
| 141 | 100 Trying (re) | KSCYMO-LNC | LNX-I-CSCF(e) | SD0e9ce501-536c | | | | Jul 5, 2006 11:10:45.245242000 CDT | |
| 142 | | | | | | | | | |
| 143 | Megaco | From | To | TermID | ECAN | | | Timestamp | |
| 144 | Add Request - 2 | KSCYMO-LNC | FTWOTX-LMG | | | | | Jul 5, 2006 11:10:45.257049000 CDT | |
| 145 | | | | | | | | | |
| 146 | SIP | From | To | Call ID | | | | Timestamp | |
| 147 | 100 Trying (re) | RST-I-CSCF(o) | LNX-SBC-T | 001E8939-5465F | | | | Jul 5, 2006 11:10:45.334706748 CDT | |
| 148 | | | | | | | | | |

*FIG. 5D.*

| | A | B | C | D | E | F | G | H | I |
|---|---|---|---|---|---|---|---|---|---|
| 148 | | | | | | | | | |
| 149 | SIP | From | To | Call ID | | | SDP IP | SDP Port | Timestamp |
| 150 | re-INVITE | PSTI-CSCF(@) | KSCYMO-LMC | 8016D938-5f6a2F | | | | | |
| 151 | | | | | | | | | |
| 152 | MEGACO | From | To | CTXT ID | TermID | SDP IP | SDP Port | Timestamp |
| 153 | Add Reply - 2 | FTWOTX-LNG | KSCYMO-LMC | | 4000485 | 172.16.137.165 | 34230 | Jul 5, 2006 11:10:45.367174000 CDT |
| 154 | | | | | | | | | |
| 155 | RTP 172.16.89.70/52348 <> 172.16.137.165/34230 | | | | | | | | |
| 156 | | | | | | | | | |
| 157 | SIGTRAN | From | To | OPC | DPC | RelCode | | Timestamp |
| 158 | REL | KSCYMO-LMC | KSCYMO-LSG | 214.195.1 | 214.45.1 | Normal - unspecified | | Jul 5, 2006 11:10:45.489234000 CDT |
| 159 | | | | | | | | | |
| 160 | SIGTRAN | From | To | OPC | DPC | RelCode | | Timestamp |
| 161 | REL | KSCYMO-LMC | KSCYMO-LSG | 214.195.1 | 214.30.3 | Normal clearing | | Jul 5, 2006 11:10:54.569063000 CDT |
| 162 | | | | | | | | | |
| 163 | | | | | | | | | |
| 164 | | | | | | | | | |
| 165 | | | | | | | | | |
| 166 | | | | | | | | | |

*FIG. 5E.*

| | A | B | C | D | E | F | G | H | I | J |
|---|---|---|---|---|---|---|---|---|---|---|
| 1 | Msg Type | FROM | TO | Megaco CTXT | Megaco TermID | SIP CallID | SIP Endpoint IP | SIP Endpoint Port | SS7 CIC | SS7 Cause Code |
| 2 | | | | | | | | | | |
| 3 | | | | | | | | | | |
| 4 | IAM | ANHMCA-LSG | ANHMCA-LNC | | | | | | | |
| 5 | Add Request - 1 | ANHMCA-LNC | TACMWA-LNG | | T/4/1/6 | | | | | |
| 6 | Add Request - 2 | ANHMCA-LNC | TACMWA-LNG | | T/4/1/6 | | | | | |
| 7 | Add Reply - 1 | TACMWA-LNG | ANHMCA-LNC | 2000063 | | | | | | |
| 8 | Add Reply - 2 | TACMWA-LNG | ANHMCA-LNC | 2000063 | | | | | | |
| 9 | INVITE | ANHMCA-LNC | LNX-F5 Big IP | | | 0006F148-440D4 | 172.16.139.229 | 19148 | | |
| 10 | INVITE | ANHMCA-LNC | LNX-I-CSCF(t) | | | 0006F148-440D4 | 172.16.139.229 | 19148 | | |
| 11 | 100 Trying | LNX-I-CSCF(t) | ANHMCA-LNC | | | 0006F148-440D4 | 172.16.139.229 | 19148 | | |
| 12 | INVITE | LNX-SBC-T | LNX-CCS | | | 0006F148-440D4 | | | | |
| 13 | INVITE | LNX-SBC-U | LNX-CCS | | | SDvn282201-d32a | 10.30.243.134 | 49256 | | |
| 14 | 100 Trying | LNX-CCS | LNX-SBC-U | | | SDvn282201-d32a | | | | |
| 15 | INVITE | LNX-CCS | LNX-SBC-U | | | c9a546727db1c3 | 10.30.243.79 | 2360 | | |
| 16 | 100 Trying | LNX-SBC-U | LNX-CCS | | | c9a546727db1c3 | | | | |
| 17 | INVITE | LNX-SBC-T | LNX-F5 Big IP | | | SDsn24601-e374 | 172.16.89.70 | 49308 | | |
| 18 | INVITE | LNX-SBC-T | LNX-I-CSCF(o) | | | SDsn24601-e374 | 172.16.89.70 | 49308 | | |
| 19 | 100 Trying | LNX-I-CSCF(o) | LNX-SBC-T | | | SDsn24601-e374 | | | | |
| 20 | QUERYWPERM | ANHMCA-LSG | ANHMCA-LSG | | | | | | | |
| 21 | RESPONSE | ANHMCA-LSG | ANHMCA-LNC | | | | | | | |
| 22 | INVITE | ANHMCA-LNC | KSCYMO-LNC | | | 0006F148-440D4 | 172.16.89.70 | 49308 | | |
| 23 | 100 Trying | KSCYMO-LNC | ANHMCA-LNC | | | 0006F148-440D4 | | | | |
| 24 | 302 Moved Temporar | KSCYMO-LNC | ANHMCA-LNC | | | 0006F148-440D4 | | | | |
| 25 | ACK | ANHMCA-LNC | KSCYMO-LNC | | | 0006F148-440D4 | | | | |
| 26 | INVITE | ANHMCA-LNC | KSCYMO-LNC | | | 0006F148-440D4 | 172.16.89.70 | 49308 | | |
| 27 | 100 Trying | KSCYMO-LNC | ANHMCA-LNC | | | 0006F148-440D4 | | | | |
| 28 | IAM | KSCYMO-LSG | ANHMCA-LSG | | | | | | 124 | |
| 29 | ACM | KSCYMO-LSG | KSCYMO-LNC | | | | | | 124 | |
| 30 | Add Request - 1 | KSCYMO-LNC | KSCYMO-LNG | 1501361 | T/4/9/24 | | | | | |
| 31 | Add Request - 2 | KSCYMO-LNC | KSCYMO-LNG | 1501361 | T/4/9/24 | | | | | |
| 32 | Add Reply - 1 | KSCYMO-LNG | KSCYMO-LNC | | | | 172.16.89.70 | 49308 | | |
| 33 | Add Reply - 2 | KSCYMO-LNG | KSCYMO-LNC | | | | 172.16.89.70 | 49308 | | |
| 34 | INVITE | ANHMCA-LNC | ANHMCA-LNC | | | 0006F148-440D4 | 172.16.129.197 | 17072 | | |
| 35 | 183 Session Progres | KSCYMO-LNC | KSCYMO-LNC | | | 0006F148-440D4 | 172.16.129.197 | 17072 | | |
| 36 | 183 Session Progres | ANHMCA-LNC | LNX-I-CSCF(o) | | | SDsn24601-e374 | | | | |

| # | Msg Type | FROM | TO | Megaco CTXT | Megaco TermID | SIP CallID | SIP Endpoint IP | SIP Endpoint Port | SS7 CIC | SS7 Cause Code |
|---|---|---|---|---|---|---|---|---|---|---|
| 36 | 183 Session Progres | ANHMCA-LNC | LNK-I-CSCF(o) | | | SDsn24801-e374 | 172.16.129.197 | 1702 | | |
| 37 | 183 Session Progres | LNK-I-CSCF(o) | LNK-SBC-T | | | SDsn24801-e374 | 172.16.129.197 | 1702 | | |
| 38 | 183 Session Progres | LNK-SBC-U | LNK-CCS | | | 09a546727d-b1c3 | 10.30.243.134 | 49258 | | |
| 39 | 180 Ringing | LNK-CCS | LNK-SBC-U | | | SDsm38201-d32a | 10.30.243.79 | 2956 | | |
| 40 | 180 Ringing | LNK-SBC-T | LNK-I-CSCF(t) | | | 0006EF48-44004 | 172.16.89.70 | 49304 | | |
| 41 | 180 Ringing | LNK-I-CSCF(t) | ANHMCA-LNC | | | 0006EF48-44004 | 172.16.89.70 | 49304 | | |
| 42 | Modify Request - 1 | ANHMCA-LNC | TACMWA-LNG | 200063 | T4/16 | | | | | |
| 43 | Modify Request - 2 | ANHMCA-LNC | TACMWA-LNG | 200063 | T4/16 | | | | | |
| 44 | Modify Reply - 1 | TACMWA-LNG | ANHMCA-LNC | 200063 | | | 172.16.89.70 | 49304 | | |
| 45 | Modify Reply - 2 | TACMWA-LNG | ANHMCA-LNC | 200063 | | | 172.16.89.70 | 49304 | | |
| 46 | ACM | ANHMCA-LNC | ANHMCA-LSG | | | | | | | |
| 47 | ANM | KSCYMO-LSG | KSCYMO-LNC | | | | | | 124 | |
| 48 | 214:45:1<=>124 | | | | | | | | | |
| 49 | 200 OK | KSCYMO-LNC | ANHMCA-LNC | | | 0006F148-44004 | 172.16.129.197 | 1702 | | |
| 50 | 200 OK | ANHMCA-LNC | KSCYMO-LNC | | | 0006F148-44004 | 172.16.129.197 | 1702 | | |
| 51 | 200 OK | ANHMCA-LNC | LNK-I-CSCF(t) | | | SDsn24801-e374 | 172.16.129.197 | 1702 | | |
| 52 | 200 OK | LNK-I-CSCF(o) | LNK-SBC-U | | | SDsn24801-e374 | 172.16.129.197 | 1702 | | |
| 53 | RTP 172.16.89.70/49336 <> 172.16.129.197/17072 | | | | | | | | | |
| 54 | 200 OK | LNK-SBC-U | LNK-CCS | | | 09a546727d-b1c3 | 10.30.243.134 | 49258 | | |
| 55 | RTP 10.30.243.79/2956 <> 10.30.243.134/49258 | | | | | | | | | |
| 56 | ACK | LNK-CCS | LNK-SBC-U | | | 09a546727d-b1c3 | | | | |
| 57 | ACK | LNK-SBC-T | LNK-I-CSCF(t) | | | SDsn24801-e374 | | | | |
| 58 | ACK | LNK-I-CSCF(o) | ANHMCA-LNC | | | SDsn24801-e374 | | | | |
| 59 | ACK | LNK-CCS | LNK-SBC-U | | | SDsm38201-d32a | 10.30.243.79 | 2956 | | |
| 60 | RTP 10.30.243.134/49258 <> 10.30.243.79/2956 | | | | | | | | | |
| 61 | 200 OK | LNK-SBC-T | LNK-I-CSCF(t) | | | 0006EF48-44004 | 172.16.89.70 | 49304 | | |
| 62 | RTP 172.16.139.229/19148 <> 172.16.89.70/49304 | | | | | | | | | |
| 63 | 200 OK | LNK-I-CSCF(o) | ANHMCA-LNC | | | 0006EF48-44004 | 172.16.89.70 | 49304 | | |
| 64 | ACK | ANHMCA-LNC | LNK-I-CSCF(t) | | | 0006EF48-44004 | | | | |
| 65 | ACK | LNK-I-CSCF(o) | LNK-SBC-T | | | 0006EF48-44004 | | | | |
| 66 | ACK | LNK-CCS | LNK-SBC-U | | | SDsm38201-d32a | | | | |
| 67 | ANM | ANHMCA-LNC | ANHMCA-LSG | | | | | | | |
| 68 | re-INVITE | LNK-CCS | LNK-SBC-U | | | 09a546727d-b1c3 | | | | |
| 69 | re-INVITE | LNK-SBC-T | LNK-I-CSCF(t) | | | SDsn24801-e374 | | | | |
| 70 | re-INVITE | LNK-CCS | LNK-SBC-U | | | SDsm38201-d32a | | | | |

FIG. 6C.

| | A | B | C | D | E | F | G | H | I | J |
|---|---|---|---|---|---|---|---|---|---|---|
| 1 | Msg Type | FROM | TO | Megaco CTXT | Megaco Term ID | SIP CallID | SIP Endpoint IP | SIP Endpoint Port | SS7 CIC | SS7 Cause Code |
| 70 | re-INVITE | LNX-CCS | LNX-SBC-U | | | SDwn38C01-d32a | | | | |
| 71 | re-INVITE | LNX-SBC-T | LNX-I-CSCF(t) | | | 0006EF4B-440D4 | | | | |
| 72 | 100 Trying (re) | LNX-I-CSCF(t) | LNX-SBC-T | | | SDsn24B01-e374 | | | | |
| 73 | 100 Trying (re) | LNX-I-CSCF(t) | LNX-SBC-T | | | 0006EF4B-440D4 | | | | |
| 74 | re-INVITE | LNX-I-CSCF(t) | ANHMCA-LNC | | | SDsn24B01-e374 | | | | |
| 75 | 100 Trying (re) | ANHMCA-LNC | LNX-I-CSCF(t) | | | SDsn24B01-e374 | | | | |
| 76 | re-INVITE | ANHMCA-LNC | KSCYMO-LNC | | | 0006F14B-440D4 | | | | |
| 77 | re-INVITE | ANHMCA-LNC | KSCYMO-LNC | | | 0006EF4B-440D4 | | | | |
| 78 | 100 Trying (re) | ANHMCA-LNC | KSCYMO-LNC | | | 0006EF4B-440D4 | | | | |
| 79 | Subtract Request - 1 | KSCYMO-LNC | KSCYMO-LNC | 1501361 | | | | | | |
| 80 | Add Request - 2 | KSCYMO-LNG | KSCYMO-LNC | 1501361 | | | | | | |
| 81 | Subtract Request - 1 | TACMWA-LNG | TACMWA-LNG | 2000063 | | | | | | |
| 82 | Add Request - 2 | ANHMCA-LNC | TACMWA-LNG | 2000063 | | | | | | |
| 83 | 100 Trying (re) | KSCYMO-LNG | ANHMCA-LNC | | | 0006F14B-440D4 | | | | |
| 84 | Subtract Reply - 1 | KSCYMO-LNG | KSCYMO-LNC | 1501361 | | | | | | |
| 85 | Add Reply - 2 | KSCYMO-LNG | KSCYMO-LNC | 1501361 | | | | | | |
| 86 | Subtract Reply - 1 | TACMWA-LNG | ANHMCA-LNC | 2000063 | | | | | | |
| 87 | Add Reply - 2 | TACMWA-LNG | ANHMCA-LNC | 2000063 | | | | | | |
| 88 | 200 OK (re) | ANHMCA-LNC | LNX-I-CSCF(t) | | | 0006EF4B-440D4 | | | | |
| 89 | RTP 172.16.139.229/22148 <> 172.16.89.78/49304 | | | | | | | | | |
| 90 | 200 OK (re) | KSCYMO-LNC | ANHMCA-LNC | | | 0006EF4B-440D4 | 172.16.129.197 | 2072 | | |
| 91 | 200 OK (re) | ANHMCA-LNC | LNX-I-CSCF(t) | | | SDsn24B01-e374 | 172.16.129.197 | 2072 | | |
| 92 | 200 OK (re) | LNX-I-CSCF(t) | LNX-SBC-T | | | 0006EF4B-440D4 | 172.16.139.229 | 2148 | | |
| 93 | 200 OK (re) | LNX-SBC-U | LNX-CCS | | | SDwn38C01-d32a | 10.30.243.134 | 49256 | | |
| 94 | 200 OK (re) | LNX-SBC-U | LNX-CCS | | | SDsn24B01-e374 | 172.16.129.197 | 2072 | | |
| 95 | 200 OK (re) | LNX-SBC-U | LNX-CCS | | | 09z5467727.6b1c3 | 10.30.243.134 | 49256 | | |
| 96 | ACK (re) | LNX-CCS | LNX-SBC-U | | | SDwn38C01-d32a | 10.30.243.134 | 49256 | | |
| 97 | ACK (re) | LNX-SBC-T | LNX-I-CSCF(t) | | | 0006EF4B-440D4 | 172.16.129.197 | 2072 | | |
| 98 | ACK (re) | LNX-CCS | LNX-SBC-U | | | 09z5467727.6b1c3 | 10.30.243.134 | 49256 | | |
| 99 | ACK (re) | LNX-I-CSCF(t) | ANHMCA-LNC | | | 0006EF4B-440D4 | 172.16.139.229 | 2148 | | |
| 100 | ACK (re) | LNX-I-CSCF(t) | ANHMCA-LNC | | | SDsn24B01-e374 | 172.16.139.229 | 2148 | | |
| 101 | ACK (re) | LNX-SBC-T | LNX-I-CSCF(t) | | | SDsn24B01-e374 | 172.16.129.197 | 2072 | | |
| 102 | Modify Request - 1 | ANHMCA-LNC | TACMWA-LNG | 2000063 | | | | | | |
| 103 | RTP 172.16.139.229/22148 <> 172.16.129.197/20372 | | | | | | | | | |
| 104 | ACK (re) | ANHMCA-LNC | KSCYMO-LNC | | | 0006F14B-440D4 | 172.16.129.197 | 2148 | | |

| | A | B | C | D | E | F | G | H | I | J |
|---|---|---|---|---|---|---|---|---|---|---|
| 1 | Msg Type | FROM | TO | Megaco CTXT | Megaco Term | SIP CallID | SIP Endpoint IP | SIP Endpoint Port | SS7 OPC | SS7 Cause Code |
| 104 | ACK (re) | ANHMCA-LNC | KSCYMO-LNC | | | 0006F148-440D4 | 172.16.139.229 | 22148 | | |
| 105 | Modify Request - 1 | KSCYMO-LNC | KSCYMO-LNG | 1501361 | | | 172.16.139.229 | 22148 | | |
| 106 | RTP 172.16.129.197/20072 <> 172.16.139.229/22148 | | | | | | | | | |
| 107 | Modify Reply - 1 | TACMWA-LNG | ANHMCA-LNC | 2000063 | | | 172.16.129.197 | 20072 | | |
| 108 | Modify Reply - 1 | KSCYMO-LNG | KSCYMO-LNC | 1501361 | | | 172.16.139.229 | 22148 | | |
| 109 | CPG | KSCYMO-LSG | KSCYMO-LNC | | | | | | 124 | |
| 110 | REL | KSCYMO-LSG | KSCYMO-LNC | | | | | | 124 | Normal clearing |
| 111 | Subtract Request - 1 | KSCYMO-LNC | KSCYMO-LNG | 1501361 | | | | | | |
| 112 | Subtract Reply - 1 | KSCYMO-LNG | KSCYMO-LNC | 1501361 | | | | | | |
| 113 | Subtract Reply - 2 | KSCYMO-LNG | KSCYMO-LNC | 1501361 | | | | | | |
| 114 | RLC | KSCYMO-LNC | KSCYMO-LSG | | | | | | 124 | |
| 115 | BYE | KSCYMO-LNC | ANHMCA-LNC | | | 0006F148-440D4 | | | | |
| 116 | 200 OK | ANHMCA-LNC | KSCYMO-LNC | | | 0006F148-440D4 | | | | |
| 117 | BYE | LNX-I-CSCF(o) | LNX-SBC-T | | | SDsn24631-e374 | | | | |
| 118 | BYE | LNX-I-CSCF(o) | LNX-SBC-T | | | SDsn24631-e374 | | | | |
| 119 | BYE | LNX-SBC-U | LNX-CCS | | | 09a54672706b1c3 | | | | |
| 120 | 200 OK | LNX-CCS | LNX-SBC-U | | | 09a54672706b1c3 | | | | |
| 121 | 200 OK | LNX-SBC-T | LNX-I-CSCF(o) | | | SDsn24631-e374 | | | | |
| 122 | BYE | LNX-CCS | LNX-SBC-J | | | SDvn39201-d52a | | | | |
| 123 | BYE | LNX-SBC-T | LNX-I-CSCF(o) | | | SDsn24631-e374 | | | | |
| 124 | 200 OK | LNX-I-CSCF(o) | ANHMCA-LNC | | | 0006EF48-440D4 | | | | |
| 125 | BYE | LNX-I-CSCF(o) | ANHMCA-LNC | | | SDsn24631-e374 | | | | |
| 126 | Subtract Request - 1 | ANHMCA-LNC | TACMWA-LNG | 2000063 | | | | | | |
| 127 | Subtract Reply - 1 | TACMWA-LNG | ANHMCA-LNC | 2000063 | | | | | | |
| 128 | Subtract Reply - 2 | TACMWA-LNG | ANHMCA-LNC | 2000063 | | | | | | |
| 129 | 200 OK | ANHMCA-LNC | LNX-I-CSCF(o) | | | 0006EF48-440D4 | | | | |
| 130 | 200 OK | LNX-I-CSCF(o) | LNX-SBC-T | | | 0006EF48-440D4 | | | | |
| 131 | 200 OK | LNX-SBC-U | LNX-CCS | | | SDvn39201-d52a | | | | |
| 132 | REL | ANHMCA-LSG | ANHMCA-LNC | | | | | | | Normal clearing |
| 133 | RLC | ANHMCA-LNC | ANHMCA-LSG | | | | | | | |

*FIG. 6D.*

PRESENTING VOP CALL TRACE DATA

BACKGROUND

In various Voice Over Packet (VOP) settings (such as VoIP, VoATM, etc.) problems occur with a communications pathway. Illustrative problems may include poor sound quality, dropped calls, etc. One way of resolving issues associated with establishing communications pathways in a VOP setting is to analyze trace data received from a monitoring device.

But this trace data can often consume tens or hundreds of pages, which is difficult and time-consuming to analyze. Accordingly, there is a need for, among other things, a method and system that condenses and supplements original call trace data to make it easier to read and understand so that problems can be identified more quickly in a communications networking environment.

SUMMARY

The present invention is defined by the claims below, not this summary. Embodiments of the present invention provide a system, method, and product for, among other things, presenting call trace data in an easier to read format than what is natively received from monitoring equipment. The present invention has several practical applications in the technical arts, including reducing the time associated with identifying problems that are at least in part identifiable by portions of data in, for example, a trace file produced by a monitoring device that monitors call setup, maintenance, and tear down.

In a first aspect, a computer program product for performing a method of determining information about a communications call is provided. The method includes receiving call data (including trace data) associated with establishing a communications path to communicate at least a portion of data using a voice-over-packet technology, formatting at least a portion of said call data such that a source identifier and a destination identifier are viewable in a common area along with two or more of the following call-identifier information; physical-termination information and possible release codes.

In another illustrative aspect, a computer program product is provided for exposing information to troubleshoot a voice-over-packet call. This can include obtaining trace data associated with at least a portion of a communications link and formatting a desired subset of data from the trace data. The formatting may include indicating a source identifier associated with an origination point of a leg of the call, indicating a destination identifier associated with a destination point of a leg of the call, and listing in a viewable area common to said source identifier and to said destination identifier, predetermined portions of said trace data.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3 depicts a tiny portion of illustrative trace data associated with a communications call;

FIG. 4 depicts illustrative data associated with a type of message found in trace data according to an embodiment of the present invention;

FIGS. 5A-5E depict an illustratively formatted result that stems from an embodiment of the present invention; and FIGS. 6A-6D depict an alternative formatting of a portion of trace data according to an embodiment of the present invention.

DETAILED DESCRIPTION

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:
CM cable modem
PA phone adapter
PC personal computer
PSTN public switched telephone network
VoIP voice over internet protocol
VOP voice over packet Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a computer, and various other network devices. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 1:
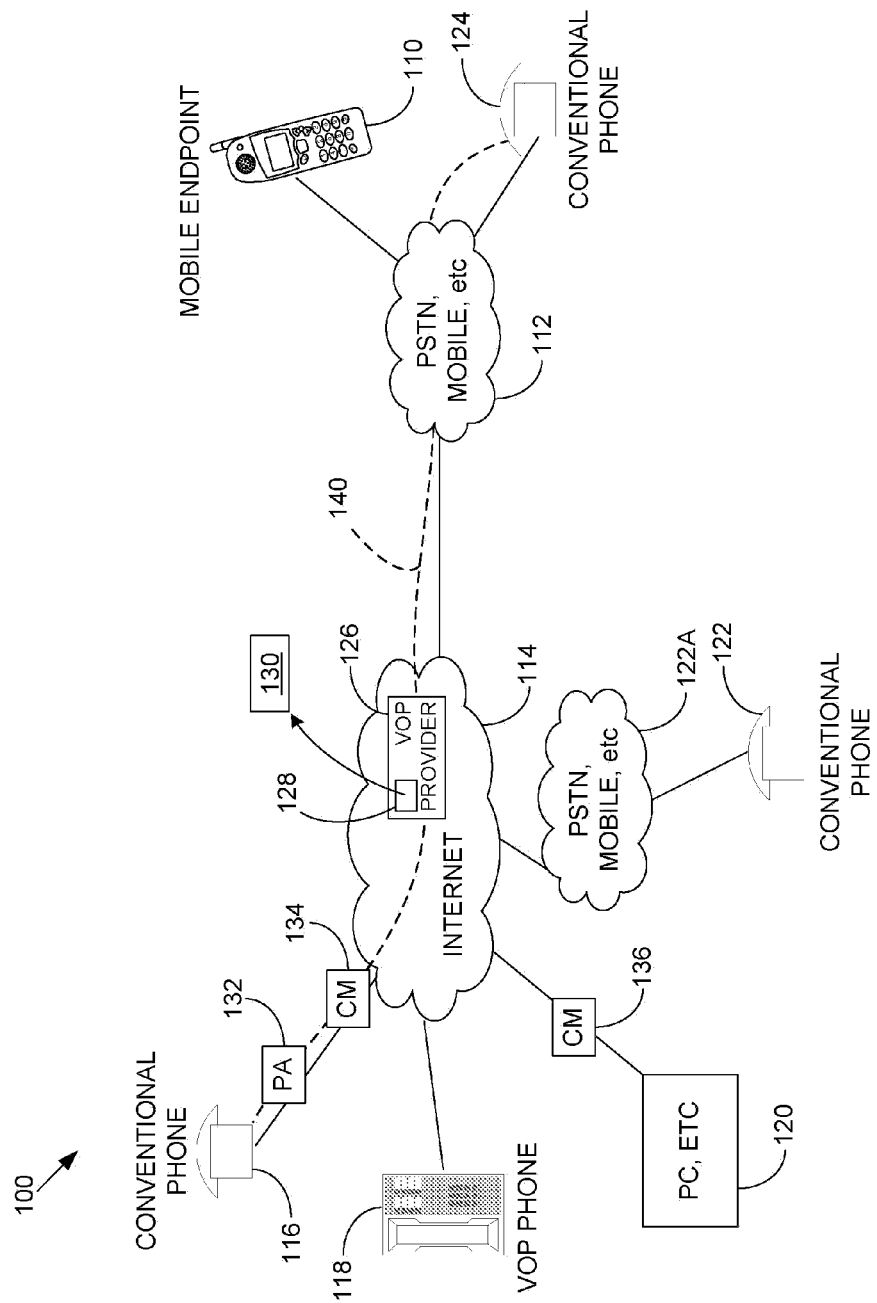
FIG. 1 depicts an illustrative operating environment suitable for practicing an embodiment of the present invention.

Turning now to FIG. 1, an illustrative operating environment suitable for practicing an embodiment of the present invention is provided and referenced generally by the numeral 100. Operating environment 100 depicts an illustrative high-level overview of communicating across one or more networks that include voice-over-packet (VOP) technology. A variety of different communications devices, in addition to those illustratively shown, could be used in connection with operating environment 100. But by way of example, a mobile end point 110 can communicate through a first network 112 (such as the PSTN, a mobile-communications network, etc., through the Internet or portion thereof 114 and ultimately to illustrative devices such as a conventional telephone 116, an Ethernet or VOP phone 118, a personal computer 120, or a second conventional phone 122.

Mobile end point 110 may take on a variety of forms of devices. For example, it may be a personal data assistant, a cell phone, notebook computer, blackberry-type device, etc. Another device that may be coupled with first network 112 includes a conventional phone 124. This is shown to make clear that the current invention is applicable even in environments made from a first conventional phone 124 to a second conventional phone 122 if at least a portion of the data is communicated via a VOP provider 126.

VOP provider 126 provides voice-over-packet communications of data from a sender to a receiver and vice versa. VOP provider 126 is associated with monitoring device 128 that gathers call data, or trace data, and various messages associated with facilitating a VOP communications call. An illustrative monitoring device includes the NgN analysis system (NgNAS) offered by Agilent Technologies, Inc., of Palo Alto, Calif. A brief overview of an illustrative system is accompanied with the filing of this application and information disclosure statement, which is incorporated by reference herein to provide additional detail as to how data associated with a communications call is gathered. Although the Agilent device is recited, it is done so in an illustrative manner to merely indicate one type of monitoring device suitable for practicing an embodiment of the invention. Clearly, a variety of other devices and types of devices can be employed to gather call trace data, which is referred to herein by reference numeral 130.

Trace data 130 is large. For example, an illustrative trace file is also submitted here with this application in an information disclosure statement, which is incorporated herein by reference to illustrate the magnitude of data included in a trace file. For example, the illustrative trace data is 123 pages in length. As previously mentioned, attempting to determine and identify desired data among such vast amounts of data has historically been a time-intensive and resource-intensive process. But an embodiment of the invention condenses and supplements the call trace data 130 into a form and format that is easily understandable by a reader. This will be explained in greater detail below.

In some embodiments, conventional phone 116 is coupled to the Internet by way of a phone adapter 132 and cable modem 134. The cable modem provides access to the Internet, and phone adapter 132 provides dial tone and other functionality to conventional phone 116. But in other embodiments a phone such as VOP phone 118 can connect directly to the Internet. Similarly, a PC 120 outfitted with a headset and any necessary call-making software can be coupled to Internet 114 by way of cable modem 136 in a residential environment, or even without cable modem 136 in a corporate or other setting that does not require a cable modem. And as previously mentioned, a second conventional phone 122 that is also coupled to the PSTN (referred to as 122A for the sake of clarity) may also be used.

Figure 2:
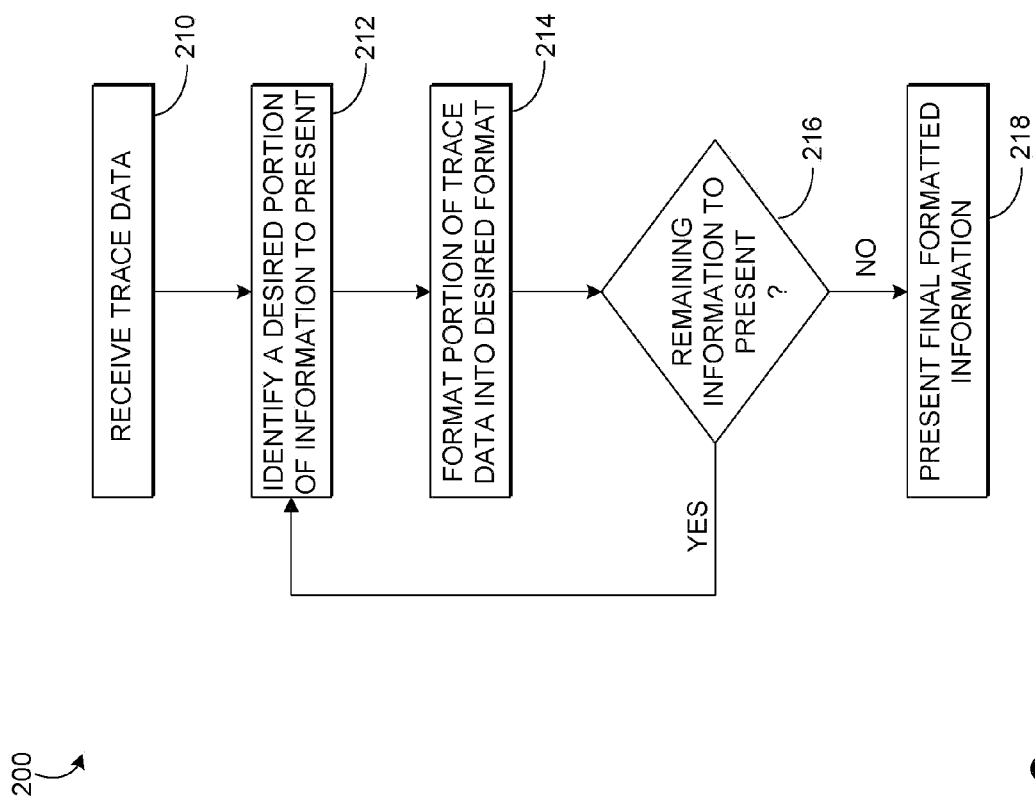
FIG. 2 depicts an illustrative method for practicing an embodiment of the present invention.

As previously mentioned call traces that emerge from monitoring device 128 or other devices such as Etheral or other network tracing tools are routinely over 100 pages long and take large amounts of time to sift through. This data is for only a single telephone call. That is, there is enough call trace data associated with a single telephone call to consume over 100 pages of text. Turning now to FIG. 2, an illustrative method for practicing an embodiment of the present invention is provided and referenced generally by the numeral 200. Under step 210 trace data 130 is received. This can take on a variety of formats.

In one embodiment, a trace file is received, and its data made accessible to a processing system, which can be a conventional computer. In another embodiment, the trace data itself is provided divorced from a trace file per se. But in either case trace data 130 is received to be processed. At a step 212, a desired portion of information that is presented is identified. The type of information that is desired can vary. Some illustrative types of information will be provided. A first type of information includes a source ID associated with a message. In one embodiment, the source ID or source identifier takes the form of an IP address. Similarly, a destination identifier associated with a message can also be sought. One embodiment of a destination identifier includes a destination IP address associated with a message. A third illustrative form of information that may be sought is a context identifier that identifies a leg of a call between two pieces of equipment.

This identifier will identify a specific leg of a specific phone call. In some embodiments, calls can have four legs or even more, and a context identifier identifies an appropriate leg associated with a call, such as illustrative call pathway 140 shown in FIG. 1. A fourth portion of information that may be desired includes an indication of a physical facility that part of the call traversed. This may be a card identifier such as a DS1/DS0 card identifier. Often the context ID is tied to this terminal identifier. A fifth portion of information that might be desired includes a SIP (session initiated protocol) call identifier. A sixth illustrative portion of information that may be desired includes a SIP end point identifier. In some embodiments, this takes the form of a SIP end point IP, which can be the same as an SDP port address used to transport voice via IP packets. Thus, a seventh type of information that may illustratively be desired to be known includes a SIP end point port, which is the address used to transport voice via IP packets. An eighth illustrative portion of information includes an SS7CIC, which is an identifier associated with information between two point codes, namely a physical termination point between two point codes on which a call rides. A final illustrative portion of information includes an SS7 cause code. A cause code can indicate a variety of causes associated with a message, such as a code indicating that a call ended normally, such as when a caller hangs up, but may include a different code if, for example, a switch malfunctioned. The aforementioned types of information that may be sought from trace data 130 are merely illustrative in nature.

At a step 214, the portion of trace data desired to be known is formatted into a desired format, which will be explained in greater detail below. At a step 216 a determination is made as to whether there is any remaining information to ultimately be presented to a reader. If yes, then processing reverts to step 212. But if no, then the final formatted information will be presented at a step 218.

Turning now to FIG. 3 the very beginning of trace data associated with a trace file is shown. As previously mentioned, this trace data can consume many tens and even over a hundred pages of information and is provided to show the cryptic form by which it originally takes as an ASCII or text file. In one embodiment, this data is searched for certain parameters to identify the beginning of a section of trace data 130 that is to be filtered. An illustrative section of data is shown in FIG. 4.

FIG. 4 shows data delineated by a string of delimiters 400 followed by an indication of what the data relates to, which here relates to a "BYE" message indicated by numeral 412. In one embodiment a temporary file for each type of message can be created taking a form of that shown in FIG. 4, so that this file can be parsed easily based on the type of message it is. For example, if the message is a "BYE" message, then the present invention will search for certain parameters or constraints in the message to be extracted and ultimately displayed in a format that will accompany a source address and a destination address with the information of the message.

Turning now to FIG. 5A, an illustrative embodiment of the present invention shows a first screen 500 of an embodiment of the final product of an embodiment of the invention, which depicts certain portions of trace data 130 in an easy-to-read format, including a filterable format. As can be seen the source address and to address (in columns B and C) accompany the previous types of information that were discussed. For example, rows 1 and 2 indicate a "sig tran" message from a specific device to another device, (from "KSCYMO-LSG" to "KSCYMO-LNC") and data corresponding to that "sig tran" message. Row 2 of FIG. 5A indicates that a human-readable identifier has been associated with a from and a to indicator. That is, instead of an obscure IP address, a device identifier has been provided. This is an example of supplementing the data originally found in data 130. The remaining portion of FIG. 5A speaks for itself in indicating the various types of information that can be provided by the present invention. FIG. 5B picks up where FIG. 5A left off, and so does FIG. 5C and FIG. 5D, and finally FIG. 5E. Collectively, FIGS. 5A through 5E illustratively show that the many tens or hundreds of pages of obscured text has been synthesized into less than four pages of information that a network analyzer could readily peruse and use to identify problems. Alternatively this data can be easily read by a script or other file to automatically take action and resolve problems or present other reports.

Turning now to FIG. 6A, an alternative method of presenting the data shown in FIGS. 5A through 5E is shown and referenced generally by the numeral 600. This data continues through FIG. 6B, FIG. 6C, and FIG. 6D. In this embodiment, each row includes the potential for the same type of data. This embodiment is somewhat more concise, but another aspect of the invention is reflected in FIG. 5A, which is to condition the type of data displayed on each row to turn on the type of message. For example, returning to FIG. 5A, it is shown that the "TAM" message of row 2 includes an "OPC" and "DST" identifiers. But the "MEGACO" record of row 4 indicates a "term ID" and "ECAN," which refer to data items that would not be present with the "sig tran" message of rows 1 and 2. In this way, data is presented in a more user-friendly format so that a user does not have to scroll to the left and to the right.

The present invention can be coded in a variety of languages. An illustrative format includes a scripting language such as "Aspect" (via Procom Plus). The application could also be a web or other network-based application.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of determining information about a communications call between a first endpoint and a second endpoint, the method comprising:
   receiving at a processing system call data associated with establishing a communications path to communicate at least a portion of data using a voice-over-packet technology, wherein said processing system is located remotely from said first endpoint and said second endpoint;
   identifying a desired portion of the received call data; and
   formatting at the processing system the desire portion of the received call data such that a source identifier and a destination identifier are simultaneously viewable in a common area along with two or more of the following:
   (1) call-identifier information;
   (2) physical-termination information; and
   (3) possible release codes;
   wherein formatting the desired portion of the received call data includes formatting said data in a filterable format; and
   wherein said filterable format includes a spreadsheet format.

2. The media of claim 1, wherein said call data includes trace data.

3. The media of claim 1, wherein receiving said call data includes receiving information from a trace file outputted from a communications monitoring device.

4. The media of claim 1, wherein formatting the desired portion of the received call data includes formatting said data such that a source identifier and a destination identifier are viewable in a common area along with two or more of the following:
   a context identifier that identifies a leg of a call between two pieces of equipment;
   an indication of a physical facility that at least part of the call traversed;
   a SIP (session initiated protocol) call identifier;
   a SIP end point identifier;
   a SIP end point port identifier;
   an SS7 signaling identifier associated with information between two point codes; and
   an SS7 cause code.

5. One or more non-transitory computer-readable media having computer-useable instructions embodied thereon for exposing information to troubleshoot a voice-over-packet call between a first endpoint device and a second endpoint device, the method comprising:
   obtaining at a remote processing system trace data associated with at least a portion of a communications link, wherein the remote processing system is located between the first endpoint device and the second endpoint device;
   extracting at the remote processing system a desired portion of the received call data; and
   formatting at the remote processing system the extracted portion of data from said trace data, said formatting comprising:
   (1) indicating a source identifier associated with an origination point of a leg of the call;
   (2) indicating a destination identifier associated with a destination point of a leg of the call; and
   (3) listing, in a viewable area common to said source identifier and to said destination identifier, predetermined portions of said trade data;
   wherein formatting the desired portion of the received call data includes formatting said data in a filterable format; and wherein said filterable format includes a spreadsheet format.

6. The media of claim 5, wherein said computer-useable instructions define an network-based application.

7. The media of claim 5, wherein said source identifier includes a source IP address of a source piece of equipment and said destination identifier includes a destination IP address of a destination piece of equipment.

8. The media of claim 5, wherein formatting the extracted portion of the received call data further includes depicting a context identifier that identifies a leg of a call between two pieces of equipment.

9. The media of claim 8, wherein formatting the extracted portion of the received call data further includes depicting an indication of a physical facility that is at least part of the call traversed.

10. The media of claim 9, wherein formatting the extracted portion of the received call data further includes depicting a SIP (session initiated protocol) call identifier.

11. The media of claim 9, wherein formatting the extracted portion of the received call data further includes depicting a SIP end point identifier.

12. The media of claim 11, wherein formatting the extracted portion of the received call data further includes depicting a SIP end point port identifier.

13. The media of claim 12 wherein formatting the extracted portion of the received call data further includes depicting an SS7 signaling identifier associated with information between two point codes.

14. The media of claim 13, wherein formatting the extracted portion of the received call data further includes depicting an SS7 cause code.

15. A method for synthesizing call-trace data including:
analyzing a trace file that includes call-setup information associated with a communications call between a first device and a second device to identify certain strings present in said information, the trace file having a first format, and wherein the trace file is stored at a location that is remote from the first device and from the second device;
based on said strings, extracting data related to said strings; and
outputting the extracted data to a second file in a filterable second format, wherein the second format is different from the first format, and said filterable second format includes a spreadsheet format, and wherein when the second file is viewed, a source identifier and a destination identifier are simultaneously viewable in a common area along with two or more of the following:
(1) call-identifier information;
(2) physical-termination information; and
(3) possible release codes.

* * * * *